United States Patent
Baer

(10) Patent No.: US 12,192,113 B2
(45) Date of Patent: Jan. 7, 2025

(54) METHOD AND A NETWORK DEVICE FOR NETWORK SLICING

(71) Applicant: Telia Company AB, Solna (SE)

(72) Inventor: Anders Baer, Årsta (SE)

(73) Assignee: Telia Company AB (SE)

( * ) Notice: Subject to any disclaimer, the term of this patent is extended or adjusted under 35 U.S.C. 154(b) by 0 days.

(21) Appl. No.: 18/113,470

(22) Filed: Feb. 23, 2023

(65) Prior Publication Data

US 2023/0283569 A1    Sep. 7, 2023

(30) Foreign Application Priority Data

Mar. 2, 2022    (SE) .................................. 2250282-7

(51) Int. Cl.
*H04L 47/72* (2022.01)
*H04L 41/0803* (2022.01)
*H04L 41/0866* (2022.01)

(52) U.S. Cl.
CPC .......... *H04L 47/72* (2013.01); *H04L 41/0803* (2013.01); *H04L 41/0866* (2013.01)

(58) Field of Classification Search
CPC .. H04L 47/72; H04L 41/0803; H04L 41/0866
See application file for complete search history.

(56) References Cited

U.S. PATENT DOCUMENTS

| | | | | |
|---|---|---|---|---|
| 2006/0200251 A1* | 9/2006 | Gu | ...................... | H04L 12/4641 700/1 |
| 2010/0105454 A1* | 4/2010 | Weber | ..................... | G07F 17/32 463/1 |
| 2020/0112492 A1 | 4/2020 | Chatras et al. | | |
| 2020/0120721 A1* | 4/2020 | Lau | ........................ | H04W 76/11 |
| 2021/0058297 A1 | 2/2021 | D'Acunto et al. | | |

(Continued)

FOREIGN PATENT DOCUMENTS

| | | |
|---|---|---|
| CN | 113852995 A | 12/2021 |
| WO | WO 2019/075848 A1 | 4/2019 |

(Continued)

OTHER PUBLICATIONS

European Extended Search Report, Jun. 27, 2023, Application No. 23158232.1, European Patent Office.
Swedish Search Report, Sep. 27, 2022, Application No. 2250282-7.

*Primary Examiner* — Glenton B Burgess
*Assistant Examiner* — Jihad K Boustany
(74) *Attorney, Agent, or Firm* — Burr & Forman LLP

(57) ABSTRACT

The embodiments herein relate to a method and a network device for network slicing, the method comprising: receiving, from a terminal device, a request for at least one of reserving and assigning a network slice for an application; determining whether the application is previously known in terms of application profile or application identity; the determination being performed by matching against a plurality of application profiles and/or application identities residing in an application profile/identity database; if the application is determined to be known, providing a cost for setting up or for assigning a network slice for the application indicated in the request; and if the application is determined to be unknown, assigning a profile to the application and at least one of configuring and assigning a default network slice to the application.

12 Claims, 6 Drawing Sheets

(56) References Cited

U.S. PATENT DOCUMENTS

| | | | |
|---|---|---|---|
| 2021/0111949 A1* | 4/2021 | Collins | H04L 41/0803 |
| 2021/0250430 A1* | 8/2021 | Moon | H04M 1/026 |
| 2021/0392575 A1 | 12/2021 | Welin et al. | |
| 2021/0400572 A1 | 12/2021 | Caceres et al. | |
| 2022/0053476 A1* | 2/2022 | Aksu | H04W 28/0215 |
| 2022/0138081 A1* | 5/2022 | Varma | G06F 11/3684 |
| | | | 717/124 |
| 2022/0377650 A1* | 11/2022 | Kotaru | H04W 24/10 |
| 2022/0377751 A1* | 11/2022 | Kotaru | H04W 72/0453 |

FOREIGN PATENT DOCUMENTS

| | | |
|---|---|---|
| WO | WO 2019/141804 A1 | 7/2019 |
| WO | WO 2021/047964 A1 | 3/2021 |
| WO | WO 2022/016050 A1 | 1/2022 |

\* cited by examiner

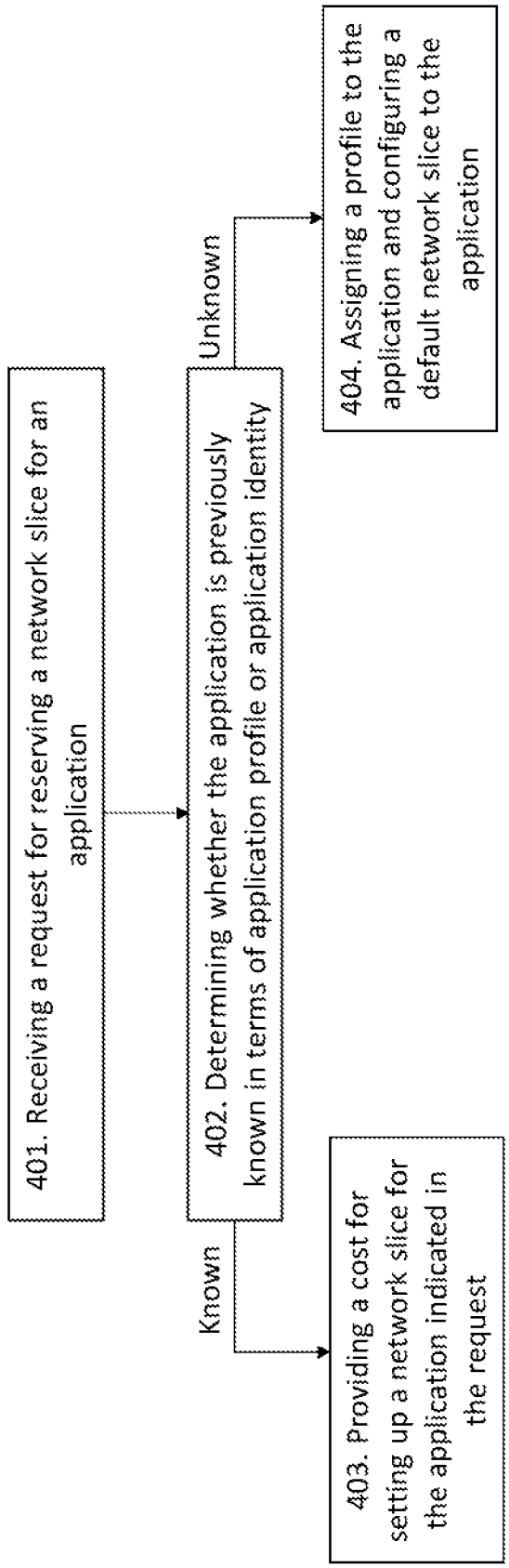

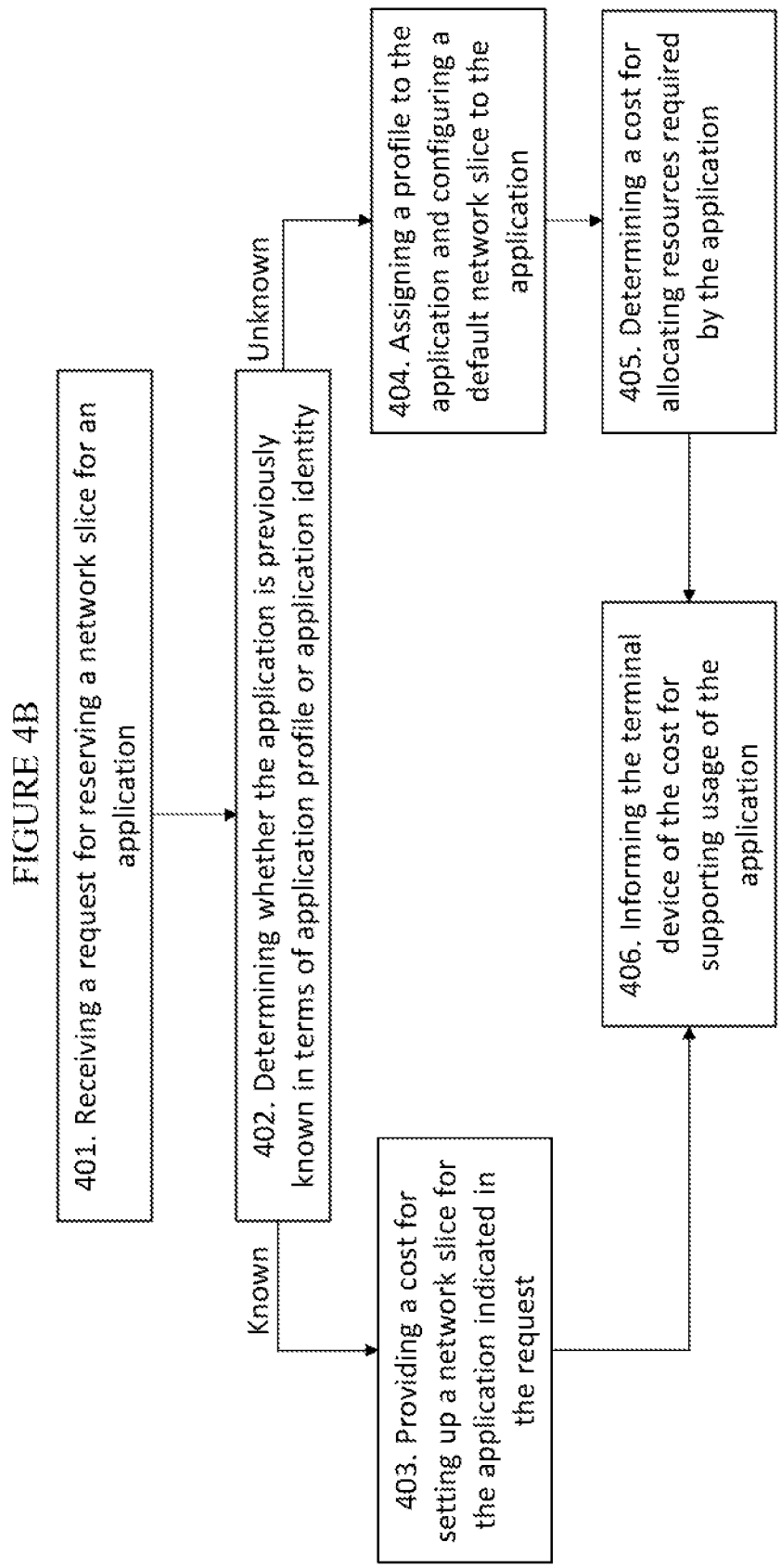

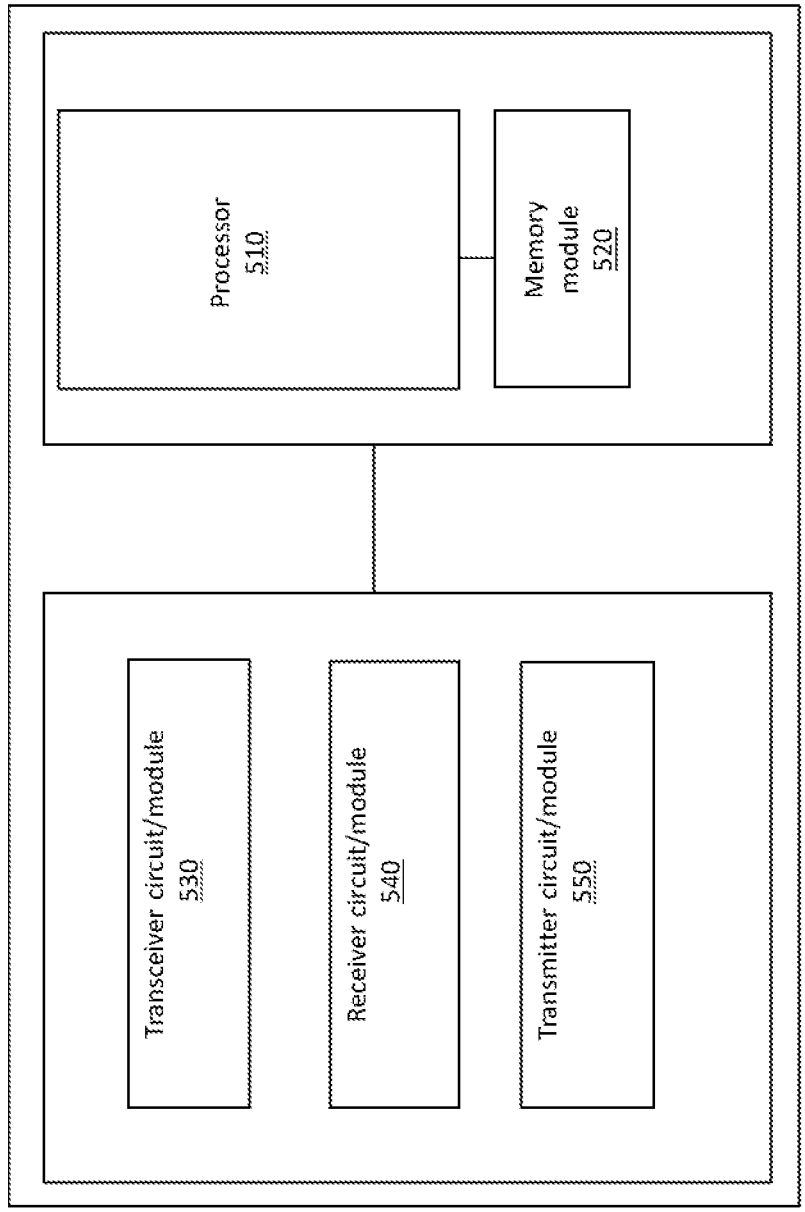

METHOD AND A NETWORK DEVICE FOR NETWORK SLICING

TECHNICAL FIELD

The present disclosure relates generally to the field of data communications, and more particularly to a method and a network device for network slicing.

BACKGROUND

Network slicing is a technology that enables multiplexing of virtualized and independent logical networks on the same physical network infrastructure. Each network slice is an end-to-end network tailored to meet the requirements on bandwidth, reliability, latency, network resources etc. for different application scenarios or services. In the fifth generation (5G) mobile communication systems, there are services or application scenarios defined and these include enhanced Mobile Broadband (eMBB), ultra-reliable Low-Latency Communication (uRLCC), and massive Machine Type Communication (mMTC). These services can be treated as "Standard Service Types" and it is important that these services are available in a roaming environment involving multiple operators and domains. Each service or application scenario usually has different network characteristics, and radio resources may be effectively allocated by configuring the respective network slice for each service or for each application scenario.

From the network slicing perspective, the standard specifies different logical descriptors such as dynamic network name (DNN), a network slice selection assistance information (S-NSSAI) which includes a slice service type (SST) and optionally a slice differentiator (SD) to differentiate application types and to allocate network means connected to a slice identity. The different logical descriptors are defined in the third generation partnership project technical specification 3GPP TS 24.526, V17.5.0 (Release 17), for the 5G system, available using the following link:

https://www.3gpp.org/ftp/Specs/archive/24_series/24.526/24526-h50.zip.

With the multitude of applications and the lack of knowledge of an application behavior it is hard to make the most efficient combination between network slicing and application needs. Further, today there is a great interest in what is known as orchestration and how this can mitigate the provisioning of slices and applications connected to it. To have pre-known knowledge, orchestration usually is based on manual configuration for defining what the needs are for an application, which is cumbersome for a network operator.

Therefore, it is desirable to have a solution that automatically detects an application and efficiently assign a network slice even if the application and its needs are not known in advance.

SUMMARY

It is an object of embodiments herein to solve the above problems by providing a method performed by an apparatus, such as a network device, for network slicing.

According to an aspect of embodiments herein, there is provided a method performed by a network device, for network slicing, the method comprising: receiving, from a terminal device (or UE), a request for reserving/assigning a network slice for an application; determining whether the application is previously known in terms of application profile or application identity; wherein the determination is performed by matching against a plurality of application profiles and/or application identities residing in an application profile/identity database. If the application is determined to be known, providing a cost for setting up or for assigning a network slice for the application indicated in the request If the application is determined to be unknown, assigning a profile to the application and configuring/assigning a default network slice to the application.

According to another aspect of embodiments herein, there is provided a network device comprising a processor and a memory, said memory containing instructions executable by said processor whereby the network device is configured to perform the methodology disclosed herein.

An advantage with embodiments herein is to automatically detect an application, even if the application itself is not pre-known, and does not identify itself as an application, and assign a network slice and a profile or identity.

Another advantage with embodiments herein is to manage all types of applications that need to be mapped to specific network slices and computer resources.

Additional advantages achieved by the embodiments of the present disclosure will become apparent from the following detailed description when considered in conjunction with the accompanying drawings.

BRIEF DESCRIPTION OF THE DRAWINGS

Example of embodiments herein are described in more detail with reference to attached drawings in which:

FIG. 4A illustrates a flowchart of a method performed by a network device according to some embodiments herein;

FIG. 4B illustrates a flowchart of a method performed by a network device according to some embodiments herein; and FIG. 5 illustrates a block diagram of a network device according to some embodiments herein.

DETAILED DESCRIPTION

In the following, a detailed description of the exemplary embodiments is presented in conjunction with the drawings to enable easier understanding of the solutions(s) described herein.

As previously described, the proposed solution builds on the idea that for an application that is not known i.e., does not identify itself as an application in a certain category, the application is allocated a default network slice and is assigned a profile using one or more identities or logical descriptors such as a S-NSSAI, DNN, STD, SD, etc. The solution which is preferably implemented in a network is triggered by receiving a request from a terminal device (such as a user equipment (UE)) for reserving/assigning a network slice for an application. The request may be in the form of a source address. The network is provided with a database which includes a plurality of application profiles and/or application identities, which is used to identify or determine whether the application is known or not and perform assignment of a network slice depending on the determination.

Figure 1:
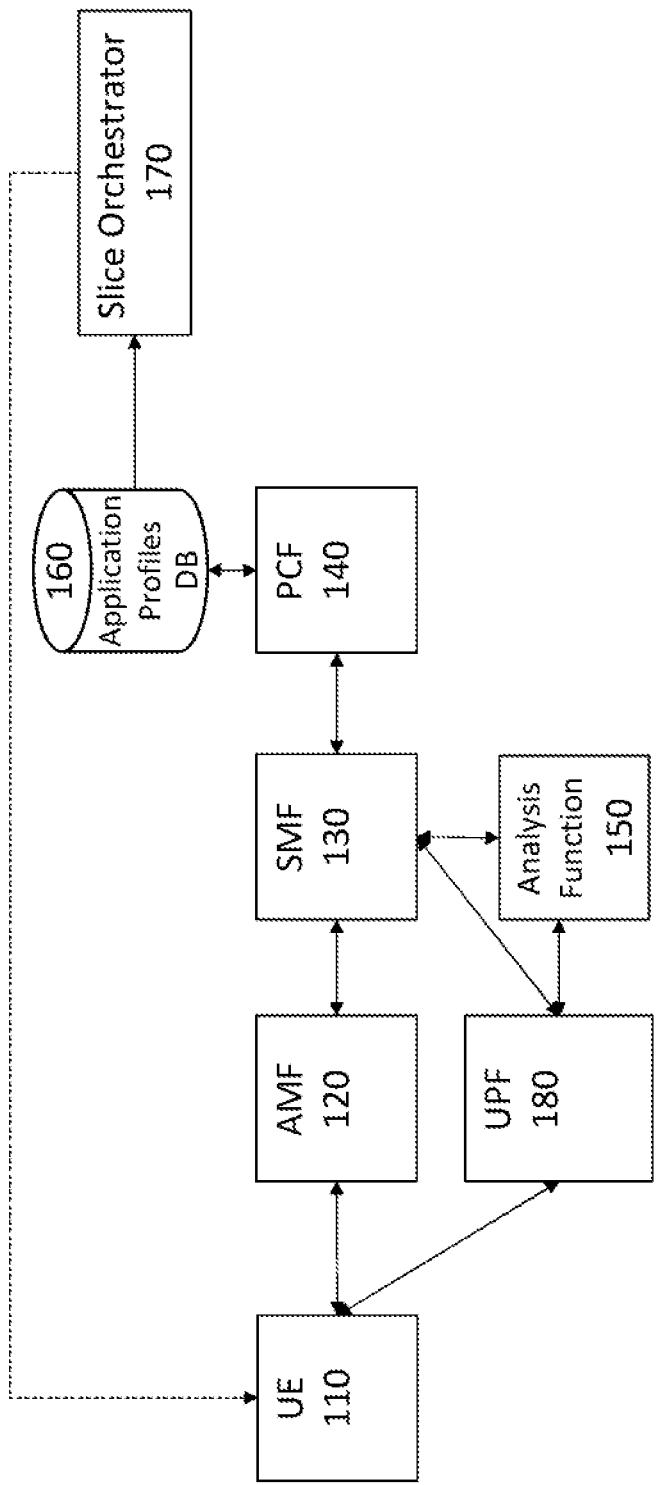
FIG. 1 is an example of a network scenario involving entities and functions according to an embodiment herein.

Referring to FIG. 1, there is illustrated a network scenario involving entities and functions in a 5G-based system wherein embodiments of present disclosure may be applied.

As shown the network comprises a UE 110, an access and mobility management function (AMF) 120, a (5G) session management function (SMF) 130, a policy control function (PCF) 140, an Analysis Function 150, a database 160, a slice orchestrator 170 and a user plane function (UPF) 180.

In 5G, the AMF 120 receives connection and session related information from the UE 110 and handles connection and mobility management tasks. It should be mentioned that UE 110 usually is connected to the network via a base station or a gNB (not shown in FIG. 1). Messages related to the session management are forwarded to the SMF 130. The SMF 130 is primarily responsible for interacting with the decoupled data plane, creating updating, and removing protocol data unit (PDU) sessions and managing session context with the UPF 180. The PCF 140 supports a unified policy framework that governs network behavior. It provides policy rules to control plane function(s) to enforce them. It should be mentioned that the following actions performed in the network may be implemented in a single network device/entity or is distributed among network entities/functions.

A UE 110 initiates a request for a certain application for reserving/assigning a network slice appropriate to serve application needs. The request is forwarded to match if the application is known from previous application profiles and/or application identities. Hence, according to an embodiment, it is determined whether the application is previously known in terms of application profile or application identity; wherein the determination is performed by matching against a plurality of application profiles and/or application identities residing in an application profile/identity database 160. The request may be analyzed in Analysis Function block 150. The Analysis Function 150 may be integral part/function of the network device.

Hence, an incoming connection or request from the UE 110 is put in an analyzing phase where specific properties of the connection an application is using is analyzed and statistics of usage may be gathered. Example of statistics include minimum or maximum bandwidth, variation flow of data packets etc. The pattern of connection usage is compared to known application patterns profiles that are already identified with matching slicing definitions.

If the application is determined to be known, a procedure is initiated to provide or offer a cost for setting up or for assigning the network slice for the application. This may be performed by the slice orchestrator 170. Hence, if there is a matching pattern the connection and slice will be connected to a known slice definition.

If the application is determined to be unknown, the Analysis Function block 150 may start to analyze a connection pattern; and a profile is assigned to the application and the application is assigned or configured with a default network slice. This can be performed after application specifics have been analyzed and then the default or customized network slice is assigned to the application. The assignment of the default slice may be performed by the slice orchestrator 170. So, if the connection pattern is not known, the application is put as a new application profile X and the appropriate slice definition will be created to support the application. The assigned default network slice is identified using a network slice selection assistance information (S-NSSAI) which includes a slice service type (SST) and optionally a slice differentiator (SD). Other descriptions may be uses as well. The Analysis Function 150 may further perform analysis on payload data stream of the application.

A connection pattern may be viewed as looking the flow of data that an application generates (send/receive) over a certain time. This would provide a range of different data (e.g., the bandwidth/throughput consumed over time t1 and time t2 being, for example 15 mbit/s-25 mbit/sec, which gives a view for bandwidth/throughput need between 15-25 mbit/s) that categorizes the application. The analysis function would be listening into the flow of traffic assign through, at least in the beginning of a connection setup, until identification is performed, and a proper slice configuration can be selected and proposed to the application or to the terminal device. The analysis function may monitor the connection pattern using specifics of what characterizes the application. The analysis function may be applied in the beginning of the connection establishment before a network slice is decided upon. The analysis function may actively monitor the connection if the application behavior changes and needs to be offered another network slice configuration. If the application is determined to be unknown, the connection pattern of the application is analyzed for determining characteristics of the application prior to assigning a profile to the application. Monitoring the connection pattern may be performed to determine if the behavior of the application does not change, and that being the case, defining the application as profile "ready" for configuring/assigning the default network slice to the application.

The Analysis Function 150 may be deployed as part of the connection chain to be able to analyze the connection setup and specifics. For example, the analysis function may start monitoring the connection (pattern) to identify application statistics and may direct a request to the instance where payload flow of the application connection is handled. The Analysis Function 150 may also perform one or more of the following operations:

Looking into application request details

Detecting new connection setup attempts

Start collecting data specific points

Analyzing data points

Building-up a profile based on behavior of the application

Defining behavior of application as profile "ready" if the behavior of the application does not change any longer Sending information on the profile to an application profile storage for enabling assignment of an appropriate network slice Enabling analysis on payload data stream of the application Etc.

Optionally, before the device sends a request for a network slice with specific characteristics, an application may have a pre-recording (or pre-determining) of the application profile characteristics. This pre-recording may be sent over the connection or slice in order to simulate real behavior of the application. The analysis function may analyze the profile pattern to match that with slice parameters and resource allocation needs to construct/configure/assign a slice for the real application to be served immediately.

According to an embodiment, if the application is determined to be unknown, a cost for allocating resources and capability required by the application is determined. The UE 110 is then informed of the cost for supporting usage of the application. According to an embodiment, the UE 110 is also requested to confirm or acknowledge the offered cost. If no confirmation or acknowledgement is received within a predetermined time interval, allocation of required resources associated with the network slice for the application is denied or put on-hold and the UE 110 is informed accordingly. On the other hand, if a confirmation or acknowledgement is received from the UE 110, then required resources are allocated for supporting usage of the application and the UE 110 is informed accordingly.

According to an embodiment, the request from the terminal device or UE 110 may comprise a declaration specifying the application profile and required resources for the application for the setting up or for the assignment of the network slice. The declaration may be sent by the UE 110 as part of the connection setup and specifies the necessities of the application for slice creation or assignment.

As an example, when an application is connecting to a given pre-provisioned slice identity that could be a default network slice identify, the declaration may be sent describing the application profile and needed resources.

A designer or creator of the application may, for example, know what resources or performance needs the application has, and these could be attached as part of the application declaration as "meta data" to publish and notify what describes the application resource needs or characteristics. Part of this action can be handled by UE route selection policy (URSP) rules (as defined in 3GPP TS 24.526 or in 3GPP TS 23.502). In 5G, network slice selection policy may be configured dynamically through URSP or statistics.

However, according to an embodiment, a more detailed part of the application specifics as part of the traffic description may be added. Examples of application characteristics are shown in the following table for three different applications denoted App X, App Y and App Z.

Application Characteristics

| Application ID | Bandwidth | Throughput (tolerance) | Latency (tolerance) | Jitter (tolerance) | Error rate (tolerance) |
|---|---|---|---|---|---|
| App X | 6000 kbps | 4000-6000 kbps | 50-80 ms | 15-20 UI pp | $10^{-6}$ |
| App Y | 25 000 kbps | 20 000-25 000 kbps | 20-25 ms | 5-10 UI pp | $10^{-9}$ |
| App Z | 120 000 kbps | 100 000-120 000 kbps | 10-15 ms | 0.3-0.5 UI pp | $10^{-9}$ |

As an example, a declaration associated with application App X, may include the following application characteristics and needed resources as "meta data": bandwidth (6000 kbps); throughput (4000-6000 kbps); latency (50-80 ms); jitter 15-20 UI pp; and an error rate ($10^{-6}$). It should be noted that application characteristics may include additional parameters for defining the application.

An application profile could be previously acknowledged by a network service and authenticated by suitable means when it is received by the network device or network function. It could also be the case for a new or unknown application that is used for the first time. In that case the application is put on an "approval list" with configurable outcome to wait for acknowledgement for assigning or creating the corresponding slice type or to create it and allow application connection over it.

Figure 2:
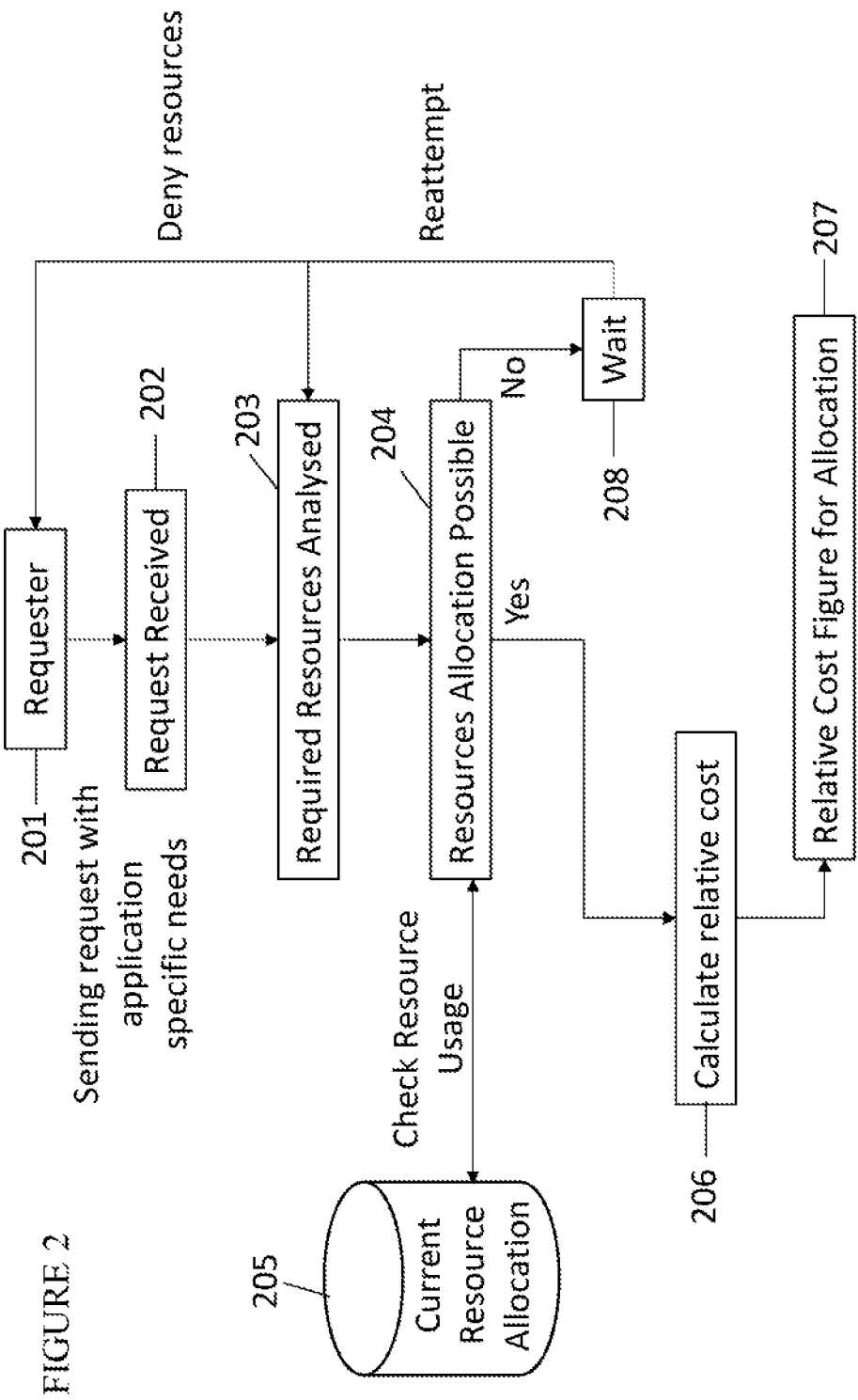
FIG. 2 is a flowchart of a method for the determination of a relative cost of application needs in terms of capabilities and resources according to an embodiment herein.

As previously described, the method further comprises offering a cost for setting up or for assigning the network slice for the application. FIG. 2 illustrates a procedure to determine or calculate a (relative) cost of application needs in terms of capabilities and resources the application requires in relation to other application resource demands and usage.

As shown, in 201, a requester (e.g., a UE or a terminal device) sends a request including application specific needs. The specific application needs may be included in a declaration as previously described. In 202, the request is received by the network device (or a network entity). In 203, the required resources for the application are analyzed, and it is determined, in 204, whether it is possible to allocate required resources. This can be performed by checking resource usage and current resource allocation in 205. If it is determined that resources can be allocated, a relative cost is determined or calculated in 206 and a relative cost value or cost figure for allocating the resources is determined in 207. If allocation of resources for the application is not possible, the network device may wait 208 for a predefined time period and may inform the requester to reattempt. If still application resources cannot be allocated, the network device denies allocation of resources and informs the requester.

Hence, the procedure described above builds on the principle to be able to offer a dynamic cost or pricing for resource allocation usage on network slice for an application. To offer true dynamic offerings, this could be based on supply and demand, the purpose is thus, for a specific demand calculate a relative cost for requested resources at a given time frame. It should be mentioned that an application could have specific and high demands for connecting and assuring the right resources to be functional. The application could have less time-demands when a connection needs to be established. The application could be offered timeslots when a given, and suitable slice is available for the need of the application. This would give the requester a choice to schedule for the connection an appropriate cost level.

Figure 3:
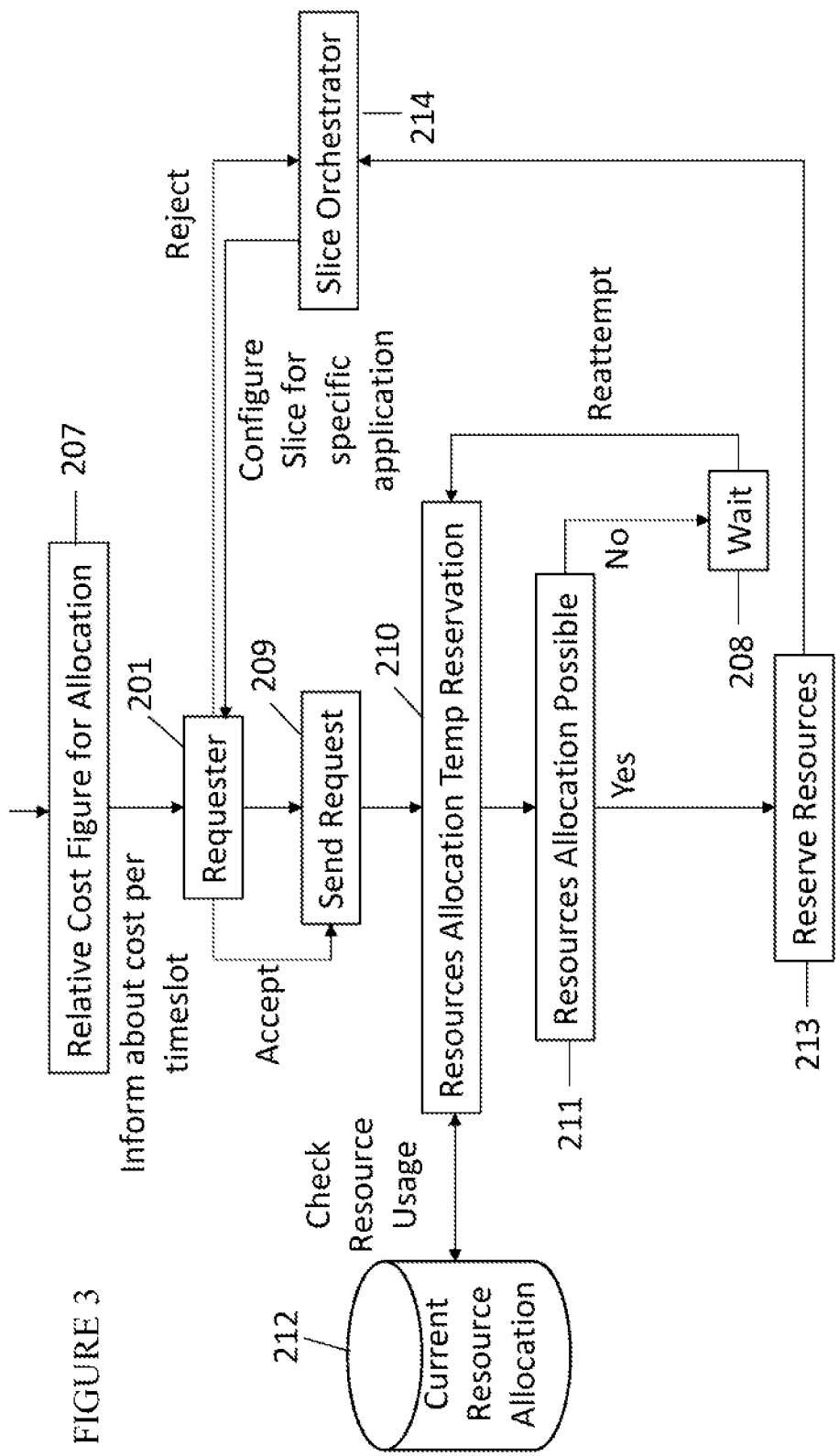
FIG. 3 is a flowchart of a method for the provision of a cost of configuring a network slice and attaching a profile to the application.

FIG. 3 illustrates the procedure when the requester is informed of the relative cost FIG. 207 for the allocation. As shown, the requester may be informed about the cost per timeslot i.e., the application is informed on the network slice to use for the application profiled when the application has got grant to connect. The requester may be presented with a number of options and a choice to select a desirable time frame(s) or timeslot(s) with a guaranteed cost or price, and/or with information on a list of costs for the requester to select from and how to accept/reject the offer, e.g., in a form of negotiation. If a slice is setup and configured for a short time, a dynamic "market" may be provided in which the offering is performed automatically with given input in form of valuation both from the requester and from the offeror of the slice, enabling negotiation between the involved parties.

The network device or a network function may communicate the slice definitions to use for a successful connection establishment.

As shown in FIG. 3, the requester 201 may decide to accept or reject the offered cost per timeslot. If the requester accepts the offer, the requester sends a request, in 209, to the network device requesting, in 210, allocation of resources or a temporary reservation of resources for the application and for the accepted offer.

It is determined, in 211, whether the resources can be allocated. This can be performed by checking resource usage and current resource allocation in 212, as in step 205 in FIG. 2. If it is determined that resources can be allocated/reserved, in 213, the slice orchestrator (of the network device) is informed in 214. Also in this scenario, the network device may wait 208 for a predefined time period and a reattempt may be performed.

If the slice requester can configure a network slice for the application, the slice orchestrator informs the requester accordingly. The slice orchestrator may configure the slice and provide common slice definitions. Otherwise, the slice orchestrator rejects the configuration of the network slice and also in this case informs the requester accordingly. The network device may have multitude of active/unactive slices for the respective applications. The network device can then decide in which order applications should be active and be allowed to connect, to balance its own resources.

According to an embodiment, the application profiles may be associated with application profile identities in a database or in the network device to be able to offer customize slicing configurations.

Pre-configured application profiles may be stored in the database or in a centralized storage (such as in database (DB) 160 of FIG. 1). The stored application profiles may then be used as a base for incoming requests to allocate slicing parameters to the application(s). Further, to assure validity of the application, an authentication process may be used to store application profile authentication keys for individual application identities in the database or in the network device.

Hence, according to an embodiment, if the request for a network slice or if an application requests a network slice or is identified by analyzing application properties and pattern, the request may include an application identity authentication request to assure validity of the application identity.

When the UE or terminal device initiates a request for reserving/assigning a network slice for an application, the request may further include or is complemented with a request including an application authentication identity, which is forwarded to the network device, where it is determined whether the application (identity) is known from stored application identities. Alternatively, it is determined whether there is an application authentication key and an associated application profile identity in the database that matches the application identity authentication in the request.

The request(s) is/are analyzed and if the application is determined to be known, the application or the application identity is validated. This means that the application is treated as approved and a network slice is allocated. Also in this scenario, for the known, authenticated and validated application, a (relative) cost is determined/calculated for the setting up or for the assignment of a network slice and the terminal device (or requester) is informed accordingly. If the application is determined to be unknown and/or un-authenticated, a default network slice is assigned and offered until application specifics have been analyzed and a customized slice can then be offered.

Referring to FIG. 4A-4B, there are illustrated flowcharts of a method performed by a network device according to previously described embodiments which are herein summarized.

The method performed by a network device for network slicing comprises:

(401) receiving, from a terminal device (e.g., UE 110), a request for reserving/assigning a network slice for an application;

(402) determining whether the application is previously known in terms of application profile or application identity; wherein the determination is performed by matching against a plurality of application profiles and/or application identities residing in an application profile/identity database 160;

(403) if the application is determined to be known, providing a cost for setting up or for assigning a network slice for the application indicated in the request;

(404) if the application is determined to be unknown, assigning a profile to the application and configuring/assigning a default network slice to the application.

According to an embodiment, if the application is determined to be unknown, the method further comprises analysing a connection pattern of the application for determining characteristics of the application prior to assigning (404) a profile to the application.

According to another embodiment, the method comprises monitoring the connection pattern and if the behavior of the application does not change, defining the application as profile ready for configuring/assigning a default network slice to the application.

As shown in FIG. 4B, if the application is determined to be unknown, the method further comprises determining (405) a (relative) cost for allocating resources and capability required by the application. The method further comprises, informing (406) the terminal device (or UE 110) of the (relative) cost for supporting usage of the application and requesting the terminal device 110 to confirm or acknowledge said offered cost.

According to an embodiment, if no confirmation or acknowledgement is received from the terminal device (or UE 110) within a predetermined time interval, the method comprises denying allocation of required resources associated with the network slice for the application and informing the terminal device 110. The predetermined time interval is a design parameter and may be configurable by a network operator. If a confirmation or acknowledgment is received from the terminal device 110, the method comprises allocating required resources for supporting usage of the application and informing the terminal device 110.

As previously described, the request from the terminal device 110 may further comprise a declaration specifying the application profile and required resources for the application for the setting up or for the assignment of the network slice. The declaration may include application characteristics in terms of bandwidth and/or throughput and/or latency and/or jitter and/or error rate. According to an embodiment, the cost for assigning a network slice, includes time-slots indicating when the network slice is available for the application. Each of the application profiles in the application profile database may include a dedicated application profile authentication key and an associated application profile identity. If the request for a network slice includes an application identity authentication request, the method comprises determining whether there is an application authentication key and an associated application profile identity in the database 160 that matches the application identity authentication in the request and that being the case validating the application identity and allocating the network slice.

To perform the embodiments described in this disclosure, a network device 500 is provided as shown in a simplified block diagram of FIG. 5. As shown, the network device 500 comprises a processing circuit or a processing module or a processor 510; a memory module 520; a receiver circuit or receiver module 540; a transmitter circuit or transmitter module 550; and a transceiver circuit or transceiver module 530 which may include the transmitter circuit 550 and the receiver circuit 540. The network device 500 may support any radio access technology including 2G, 3G, 4G, 5G, Wifi, Wimax or a combination thereof.

The processing module/circuit 510 includes a processor, microprocessor, an application specific integrated circuit (ASIC), field programmable gate array (FPGA), or the like, and may be referred to as the "processor 510." The processor 510 controls the operation of the network device 500 and its components. Memory (circuit or module) 520 includes a random-access memory (RAM), a read only memory (ROM), and/or another type of memory to store data and instructions that may be used by processor 510. In general, it will be understood that the network device 500 in one or more embodiments includes fixed or programmed circuitry that is configured to carry out the operations in any of the embodiments disclosed herein.

The processor 510 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 510 to carry out the operations of the network device 500 disclosed herein. It will be appreciated that the network device 500 may comprise additional components not shown in FIG. 5.

The network device 500, by means of processor 510, is configured to: receive, from a terminal device 110, a request for reserving/assigning a network slice for an application; the network device 500 is further configured to determine whether the application is previously known in terms of application profile or application identity; wherein the determination is performed by matching against a plurality of application profiles and/or application identities residing in an application profile/identity database 160. If the application is determined to be known, the network device 500 is configured to provide a cost for setting up or for assigning a network slice for the application indicated in the request. If the application is determined to be unknown, the network device 500 is configured to assign a profile to the application and configuring/assigning a default network slice to the application. Additional actions performed by the network device have already been described and need not be repeated.

There is also provided a computer program comprising instructions which when executed on at least one processor 510 of the network device 500 according to embodiments herein, cause the at least one processor 510 to carry out the method previously described. Also, a carrier containing the computer program is provided, wherein the carrier is one of a computer readable storage medium; an electronic signal, optical signal or a radio signal.

As demonstrated, an advantage with embodiments herein is to automatically detect an application, even if the application itself is not pre-known, and does not identify itself as an application, and assign a network slice and a profile or identity. Hence, any give application that is in the need for certain network capabilities and resources to function is allowed to request these capabilities and resources without knowing in advance what these needs are. The request may be in the form of a source address, and the solution enables collecting statistics of the application usage and then profile the statistics to match previously known applications.

In view of the foregoing, it will be appreciated that the present disclosure realizes effective management of network slicing configuration independently on whether the application is known in advance or not.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method performed by network device for network slicing, the method comprising:
   receiving, from a terminal device, a request for at least one of reserving and assigning a network slice for an application;
   determining whether the application is previously known in terms of an application profile or an application identity, the determination being performed by matching the application against a plurality of application profiles and/or application identities residing in an application profile/identity database;
   if the application is determined to be known, determining a cost for setting up or for assigning a network slice for the application indicated in the request; and
   if the application is determined to be unknown:
      analyzing a connection pattern of the application for determining characteristics of the application prior to assigning a profile to the application, the analyzing comprising:
         monitoring the connection pattern to determine whether the behavior of the application changes; and
         in response to determining that the behavior of the application has not changed, defining the application as profile ready for at least one of configuring and assigning a default network slice to the application; and
      assigning a profile to the application and at least one of configuring and assigning a default network slice to the application.

2. The method according to claim 1, wherein, if the application is determined to be unknown, further comprising determining a cost for allocating resources and capability required by the application.

3. The method according to claim 1, further comprising informing the terminal device of the cost for supporting usage of the application and requesting the terminal device to confirm or acknowledge said cost.

4. The method according to claim 3, wherein if no confirmation or acknowledgement is received within a predetermined time interval, further comprising denying allocation of required resources associated with the network slice for the application and informing the terminal device.

5. The method according to claim 3, wherein if a confirmation or acknowledgment is received from the terminal device, further comprising allocating required resources for supporting usage of the application and informing the terminal device.

6. The method according to claim 1, wherein the request from the terminal device further comprises a declaration specifying the application profile and required resources for the application for the setting up or for the assignment of the network slice.

7. The method according to claim 6, wherein the declaration includes application characteristics in terms of at least one of bandwidth, throughput, latency, jitter and error rate.

8. The method according to claim 1, wherein the cost for assigning a network slice includes time-slots indicating when the network slice is available for the application.

9. The method according to claim 1, wherein each of the application profiles in the application profile database includes a dedicated application profile authentication key and an associated application profile identity.

10. The method according to claim 9, wherein if the request for a network slice includes an application identity authentication request, further comprising determining whether there is an application authentication key and an associated application profile identity in the database that matches the application identity authentication in the request and that being the case validating the application identity and allocating the network slice.

11. The method according to claim 1, wherein the assigned default network slice is identified using a network slice selection assistance information (S-NSSAI) which includes a slice service type (SST) and optionally a slice differentiator (SD).

12. A network device comprising a processor and a memory containing instructions executable by the processor, whereby the network device is configured to:

receive, from a terminal device, a request for at least one of reserving and assigning a network slice for an application;

determine whether the application is previously known in terms of an application profile or an application identity, the determination being performed by matching the application against a plurality of application profiles and/or application identities residing in at an application profile/identity database;

if the application is determined to be known, determine a cost for setting up or for assigning a network slice for the application indicated in the request; and if the application is determined to be unknown:

analyze a connection pattern of the application for determining characteristics of the application prior to assigning a profile to the application, the analyzing comprising:

monitoring the connection pattern to determine whether the behavior of the application changes; and in response to determining that the behavior of the application has not changed, defining the application as profile ready for at least one of configuring and assigning a default network slice to the application; and assign a profile to the application and at least one of configuring and assigning a default network slice to the application.

\* \* \* \* \*